3,391,206
PREPARATION OF CYCLIC ALKENES
Frits Hartog, Beek, Netherlands, assignor to Stamicarbon N.V., Heerlen, Netherlands
No Drawing. Filed Apr. 5, 1965, Ser. No. 445,698
Claims priority, application Netherlands, Apr. 8, 1964, 6403702; Belgium, Mar. 5, 1965, 660,742
13 Claims. (Cl. 260—666)

The present invention relates to the preparation of cyclic alkenes in the catalytic hydrogenation of aromatic hydrocarbons and particularly to the preparation of cyclohexene. Cyclohexene is a valuable industrial chemical used as an intermediate or starting material in commercially important processes.

According to one known method of preparation, cyclohexene is obtained from cyclohexanol by dehydration with catalysts such as aluminum oxide and phosphoric acid. According to another method, cyclohexene is prepared from chlorocyclohexane by splitting off hydrogen chloride by means of catalysts such as barium oxide or iron chloride. While these processes are efficient and may be operated to virtually obtain the theoretical yield, for industrial applications it must also be borne in mind that consideration must be given to the availability of the basic starting material, which is generally made from benzene. Therefore, catalytic hydrogenation and other chemical operations (such as oxidation and dehydration, or halogenation and dehydrohalogenation) must also be cearried out in those prior methods.

It is generally assumed in chemistry that in the hydrogenation of aromatic hydrocarbons to cycloalkanes, cyclic alkenes are formed as intermediate products, extremely small amounts of which may be detected in the cycloaliphatic end products.

According to this invention, it has now been found that considerable amounts of cyclic alkenes may usefully be formed in the catalytic hydrogenation of aromatic hydrocarbons if the hydrogenation is carried out with a ruthenium catalyst in the presence of an alcohol.

For example, the hydrogenation of benzene, when carried out in this way, yields not only cyclohexane, but also substantial amounts of the unsaturated cyclohexene which can then be separated from benzene and cyclohexane in a simple manner, e.g. by means of sulphuric acid.

This novel process of preparing cyclohexene is commercially advantageous as compared to the aforementioned known methods of preparing cyclohexene because the comparatively difficult chemical operations such as oxidation and dehydration, or chlorination or splitting-off of hydrogen chloride, are avoided, and a considerable simplification of product can be achieved on an industrial scale. Moreover, in many cases, the reaction product composed of a mixture of benzene, cyclohexane, and cyclohexene may be used directly, without separation of the components. For instance, the conversion of cyclohexene into cyclohexanol by hydration with the aid of dilute sulphuric acid can often be carried out in a benzene-cyclohexane medium. A mixture of benzene, cyclohexane and cyclohexene may also be used in the conversion of cyclohexene into the chloride of cyclohexanone-oxime-hydrochloride by addition of nitrosyle-chloride in the presence of hydrochloric acid. Further, also the removal of hydrochloric acid from the chloride of cyclohexanone-oxime-hydrochloride may be achieved by heating in a benzene-cyclohexane medium to obtain cyclohexanone-oxime-chloride.

The process of this invention can also be applied to aromatic hydrocarbons other than benzene, in which case the corresponding cyclic alkenes are formed. For instance, toluene yields 1-methyl-cyclohexene, while ortho-xylene gives a mixture of 1,2-dimethylcyclohexene and 2,3-dimethylcyclohexene.

According to the invention, the hydrogenation is carried out in the presence of an alcohol as solvent and in the presence of a ruthenium catalyst. By preference, use is made of lower alkanols preferably having from 1–4 carbon atoms in the molecule, such as methanol, ethanol, propanol, isopropanol, butanol and iso-butanol with which best results are obtained. With other alcohols, lower yields are realized.

The amount of alcohol used can be varied. It is preferred to use 5–50% by weight of alcohol with respect to the amount of aromatic hydrocarbon, which yields good results. Smaller amounts, of less than 5% by weight, give lower yields, while the results cannot be improved by using larger amounts of more than 50% by weight.

The catalyst used in the hydrogenation is ruthenium. This catalyst may be employed in metallic form, e.g. ruthenium black, or be used on a carrier, such as aluminum oxide, silicon oxide, magnesium oxide, asbestos or carbon. If use is made of a carrier, the amount of ruthenium is at most about 4–8% by weight of the catalyst mass. The amount of catalyst to be used is not critical and need not deviate from the amounts normally employed in catalytic hydrogenations and may, for instance, be 0.1–3% by weight with respect to the amount of hydrocarbon to be hydrogenated.

The hydrogenation can be carried out in a customary hydrogenation apparatus with the aid of molecular hydrogen with or without excess pressure and in liquid or vapor phase. It is not necessary to use a high pressure, because the process can be simply carried out at atmospheric pressure. If the hydrogenation is performed in the liquid phase, the temperature may be kept below the boiling point of the aromatic reactant, e.g. below about 80° C. for benzene, and preferably at about 15–60° C. The hydrogenation may also be carried out in the vapor phase, in which case the hydrocarbon to be hydrogenated is evaporated and the resulting vapor, together with hydrogen, and, if so desired, an inert gas, such as nitrogen, is brought into contact with the catalyst. The temperature may in that case be varied between wide limits, but is preferably kept at 15–150° C.

In realizing the process according to the invention, it is also recommended procedure to control the duration of the time of contact between the hydrocarbon and the catalyst so that only incomplete conversion of the aromatic hydrocarbon occurs and so that the reaction product will contain non-converted aromatic hydrocarbon. At a low degree of conversion of the aromatic hydrocarbon, preferably 10–40%, the production of the cycloalkene will be good, whereas at higher degrees of conversion the amount of cyclic alkenes in the reaction product will be proportionately lower.

Example 1

In a 250 ml. reaction vessel provided with a stirrer, 25 ml. of benzene were mixed with 2 ml. of methanol and 50 mg. of ruthenium black. With simultaneous stirring, hydrogen was then introduced at a temperature of 25° C., the pressure being kept at 1 atm.

After 1 hour, 11% of the benzene were converted in the formation of 20 mol. percent of cyclohexene and 80 mol. percent of cyclohexane therefrom.

Example 2

25 ml. of O-xylene were mixed with 2.5 ml. of ethanol and 350 mg. of ruthenium black in the device described in Example 1. Hydrogen was introduced at a temperature of 40° C., the pressure being kept at 1 atm.

After 3 hours, 27.5% of the xylene had been converted, yielding 20 mol. percent of dimethyl cyclohexene (12 mol. percent of 1.2.dimethylcyclohexene and 8 mol. percent of 2.3.dimethyl cyclohexene) and 80 mol. percent of dimethyl cyclohexane in the conversion product.

Example 3

20 ml. of benzene were mixed withm 5 ml. of butanol and 50 mg. of ruthenium black in the device described in Example 1. Hydrogen is introduced at a temperature of 15° C. the pressure being kept at 1 atm.

After 1 hour 10% of the benzene had been converted and 6 mol. percent of cyclohexene and 94 mol. percent of cyclohexane had formed therefrom.

Example 4

A glass tube (diameter 6 mm.) was filled over 10 cm. of its length with a catalyst consisting of an aluminum oxide carrier on which 5% by weight of ruthenium have been applied.

A stream of hydrogen at 60° C. was passed through benzene to which 10% by weight of methanol had been added, and the hydrogen-vapor mixture was passed through the glass tube containing the catalyst at a temperature and pressure of 60° C. and 1 atm., respectively.

The hourly flowrate per gram of catalyst amounts to 700 liters of hydrogen (measured at 0° C. and 1 atm.) and 270 ml. of the benzene-alcohol mixture.

The reaction mixture issuing from the tube was condensed and in this continuous process 10% conversion of the benzene was achieved with the formation of 7 mol percent of cyclohexene therein.

What is claimed is:

1. A process for the conversion of aromatic hydrocarbon to the corresponding cycloalkene which consists essentially in partially hydrogenating said hydrocarbon in the presence of a lower alkanol as solvent with molecular hydrogen gas and with a ruthenium catalyst.

2. The process of claim 1, wherein said alkanol is present in an amount of about 5–50% by weight with respect to the amount of said aromatic hydrocarbon.

3. The process of claim 1, wherein in said alkanol contains from 1 to 4 carbon atoms.

4. The process of claim 1 characterized in that wherein the process is carried out in the liquid phase at a temperature of about 15–60° C.

5. The process of claim 1, characterized in that wherein the process is carried out in the vapor phase at a temperature of about 15–50° C.

6. The process of claim 1, characterized in that wherein from 10–40% of the aromatic hydrocarbon are converted to hydrogenated products including said cycloalkene.

7. The process of claim 1, wherein said aromatic hydrocarbon is a benzenoid hydrocarbon carrying from 1 to 2 lower alkyl substituents.

8. The process of claim 1, wherein said aromatic hydrocarbon is benzene and the corresponding alkene is cyclohexene.

9. The process of claim 1, wherein said aromatic hydrocarbon is ortho-xylene and the cycloalkene product is a mixture of 1,2- and 2,3-dimethyl cyclohexenes.

10. The process of claim 1, wherein said ruthenium catalyst is ruthenium black.

11. The process of claim 1, wherein said ruthenium catalyst is employed on a carrier selected from the class consisting of aluminum oxide, silicon oxide, magnesium oxide, asbestos and carbon.

12. The process of claim 11, wherein said ruthenium comprises 4–8% by weight of the catalyst mass.

13. The process of claim 1, wherein said ruthenium catalyst is present in an amount between about 0.1 and 3% by weight with respect to the amount of said aromatic hydrocarbon.

References Cited

UNITED STATES PATENTS 2,360,555   10/1944   Evans et al. _____ 260—666

OTHER REFERENCES

George Holmes Richter, Textbook of Organic Chemistry, 2nd ed., John Wiley and Sons, Inc., New York, p. 393, 1947.

DELBERT E. GANTZ, *Primary Examiner.*

V. O'KEEFE, *Assistant Examiner.*